United States Patent [19]

Katto

[11] Patent Number: 5,602,593
[45] Date of Patent: Feb. 11, 1997

[54] OVERLAPPED MOTION COMPENSATION USING A WINDOW FUNCTION WHICH VARIES IN RESPONSE TO AN INPUT PICTURE

[75] Inventor: Jiro Katto, Tokyo, Japan

[73] Assignee: NEC Corporation, Tokyo, Japan

[21] Appl. No.: 394,162

[22] Filed: Feb. 22, 1995

[30] Foreign Application Priority Data

Feb. 22, 1994 [JP] Japan .................................. 6-023856

[51] Int. Cl.$^6$ .............................. H04N 7/36; H04N 7/50
[52] U.S. Cl. ............................................. 348/416; 348/699
[58] Field of Search .................................. 348/402, 413, 348/416, 699

[56] References Cited

U.S. PATENT DOCUMENTS

| | | | |
|---|---|---|---|
| 5,136,376 | 8/1992 | Yagasaki | 348/409 |
| 5,311,310 | 5/1994 | Jozawa | 348/416 |
| 5,504,931 | 4/1996 | Furtek | 348/416 |

FOREIGN PATENT DOCUMENTS 4-245884  9/1992  Japan .

OTHER PUBLICATIONS

Cheung Auyeung et al., "Overlapped Block Motion Compensation", *SPIE*, vol. 1818 Visual Communications and Image Processing '92, pp. 561–572.

Jiro Katto et al., "Overlapped Motion Compensation for Low Bit–Rate Video Coding", Int. Workshop on Multimedia Mobile Communications, Dec. 1993, pp. B.1.3–1–B.1.3–6.

*Primary Examiner*—Howard W. Britton
*Attorney, Agent, or Firm*—Sughrue, Mion, Zinn, Macpeak & Seas

[57] ABSTRACT

On predictively producing a motion compensation prediction picture predictive of a current picture by using a previous picture which precedes the current picture among successive pictures represented by an input picture signal, a window function producing circuit (40) produces a window function in response to the current picture. Each picture comprises a predetermined number of blocks of pixels. The window function producing circuit comprises an interpixel correlation calculating circuit (21) for calculating an interpixel correlation from the pixels of the current picture and a window function determining circuit (23) for determining the window function on the basis of the interpixel correlation. A memorizing circuit (38) memorizes the previous picture as a reference picture. A vector detecting circuit (37) detects a motion vector representative of a movement of each block of the current picture between the current and the reference pictures and delivers the motion vectors for the blocks of the current picture to the memorizing circuit to make the memorizing circuit produce, as reference blocks, the blocks of the reference picture that are determined by the motion vectors for the blocks of the current picture. A prediction picture producing circuit (39) produces the motion compensation prediction picture given by multiplying each of the reference blocks by the window function and by adding the reference blocks multiplied by the window function to one another.

12 Claims, 3 Drawing Sheets

OVERLAPPED MOTION COMPENSATION USING A WINDOW FUNCTION WHICH VARIES IN RESPONSE TO AN INPUT PICTURE

BACKGROUND OF THE INVENTION

This invention relates to a motion compensation prediction picture producing device for use in a motion picture coding device which carries out high-efficiency coding of a digital motion picture signal representative of successive pictures, each of which may be either a frame or a field. The motion compensation prediction picture producing device is for predictively producing a motion compensation prediction picture predictive of a current picture by using a previous picture which precedes the current picture among the successive pictures.

As a high-efficiency coding technique, a motion compensation technique is known in the art. In the motion compensation technique, each of successive pictures is divided into a predetermined number of blocks of pixels (picture elements). A motion vector is detected which represents a movement of each block between two successive pictures. In this event, the motion vector is detected between an input picture (namely, a current picture) and a reference picture (namely, a previous picture) for each block of the input picture. In accordance with the motion vector and a position of each block of the input picture, a reference block is extracted from the reference picture for each block of the input picture. A prediction picture which is predictive of the input picture is produced by using the reference block extracted for each block of the input picture. The prediction picture is generally produced by using each reference block as it is.

In Japanese Unexamined Patent Publication No. 4-245884(namely, 245884/1992), a predictive coding system is disclosed which uses an overlapped motion compensation technique. In such an overlapped motion compensation technique, the prediction picture is produced by the use of a processed reference block into which each reference block extracted for each block of the input picture is processed by the use of a window function in the manner which will later be described. The overlapped motion compensation achieve a smoothing effect of smoothing discontinuities at block boundaries of the reference blocks and a prediction error suppressing effect of suppressing a prediction error as compared with a conventional motion compensation technique using no window function. Furthermore, optimization of the window function for the overlapped motion compensation is described in an article entitled "Overlapped Block Motion Compensation" written by Cheung Auyeung et al and contributed to Proc. of Visual Communications and Image Processing '92, SPIE Vol. 1818, Nov. 1992, pages 561–572 and in another article entitled "Overlapped Motion Compensation for Low Bit-Rate Video Coding" written by Jiro KATTO et al and contributed to Int. Workshop on Multimedia Mobile Communications, Dec. 1993, pages B.1.3-1–B.1.3-6.

In any one of the prior arts, use may be made of the window function which is determined independently of a characteristic or feature of the input or current picture. Inasmuch as the window function does not explicitly reflect the characteristic of the input picture, improvement in prediction efficiency is not satisfactory. In addition, a method of adaptively changing of the window function in dependence upon the characteristic of the input picture is not established. As a consequence, it is impossible to provide the window function for the overlapped motion compensation in dependence upon the characteristic of the input picture so as to reduce the prediction error. Thus, any one of the prior arts never teaches the use of the window function which varies in response to the input or the current picture.

SUMMARY OF THE INVENTION

It is therefore an object of this invention to provide a motion compensation prediction picture producing device which makes a motion picture coding device achieve overlapped motion compensation with a high prediction efficiency and a reduced prediction error.

It is another object of this invention to provide a motion compensation prediction picture producing device of the type described, which uses a window function varying in response to an input or current picture.

A motion compensation prediction picture producing device to which this invention is applicable is supplied with a digital picture signal representative of successive pictures for predictively producing a motion compensation prediction picture predictive of a current picture by using a previous picture which precedes the current picture among the successive pictures. Each of the successive pictures comprises a predetermined number of blocks of pixels.

According to this invention, the motion compensation prediction picture producing device comprises: memorizing means for memorizing the previous picture as a reference picture; vector detecting means connected to the memorizing means for detecting a motion vector representative of a movement of each block of the current picture between the current and the reference pictures, the vector detecting means delivering the motion vectors for the blocks of the current picture to the memorizing means to cause the memorizing means to produce, as reference blocks, the blocks of the reference picture that are determined by the motion vectors for the blocks of the current picture; window function producing means for producing a window function in response to the current picture; and prediction picture producing means connected to the memorizing means and the window function producing means for producing the motion compensation prediction picture given by multiplying each of the reference blocks by the window function and by adding the reference blocks multiplied by the window function to one another.

DESCRIPTION OF THE PREFERRED EMBODIMENT

Figure 1:
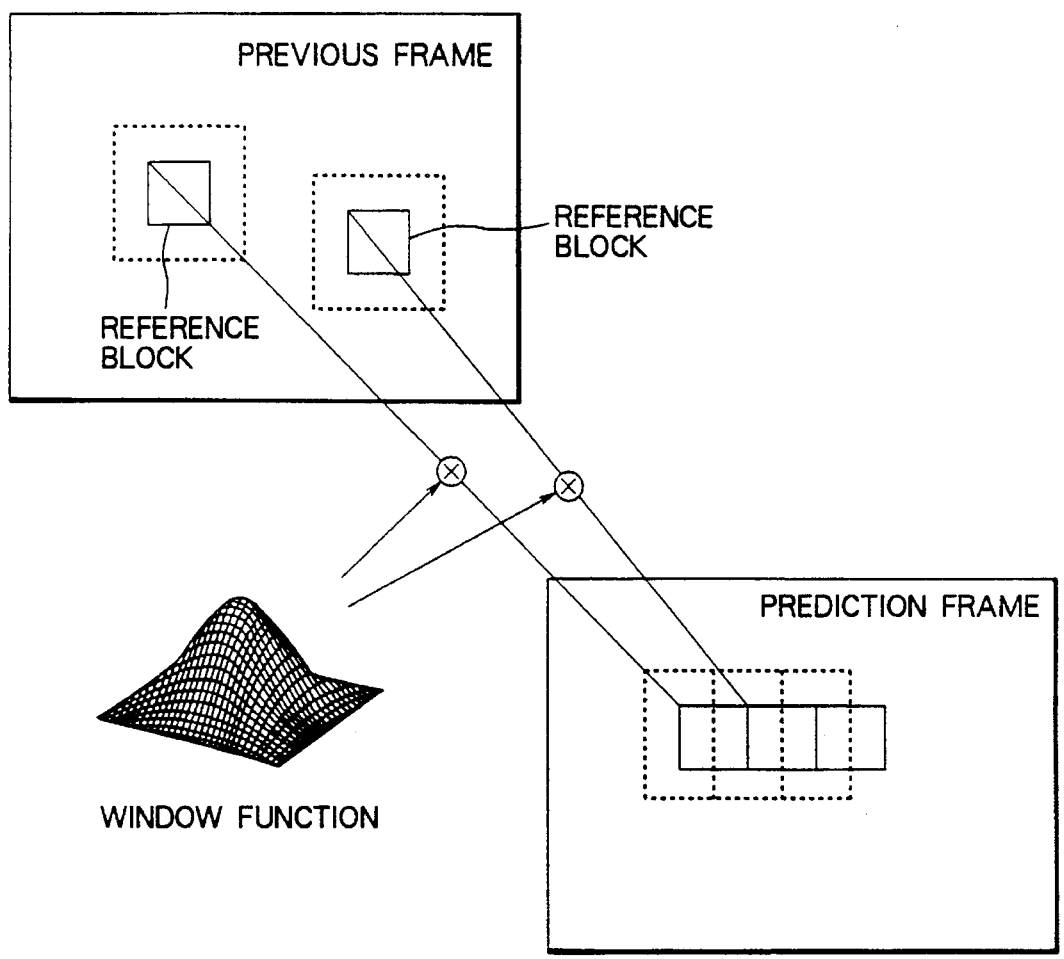
FIG. 1 is a view for use in describing an outline of a conventional overlapped motion compensation technique.

Referring to FIG. 1, description will first be made as regards a conventional overlapped motion compensation technique which is described in the preamble of the instant specification. In the overlapped motion compensation technique, reference blocks are extracted from a reference or previous picture (which is a previous frame in the illustrated example) by using motion vectors detected for blocks of an input or current picture (which is a current frame in this case), respectively, in the manner described above. Each of the reference blocks is processed into a processed reference block which is given by multiplying each of the reference blocks by a fixed window function. A motion compensation prediction picture (which is a motion compensation prediction frame in the illustrated example) is given by adding or overlapping the processed reference blocks together. The conventional overlapped motion compensation technique uses the window function which is determined independently of a characteristic or a feature of the input or current picture as described above.

On the contrary, a motion compensation prediction picture producing device according to this invention uses a window function which varies in dependence upon the characteristic or the feature of the input or current picture. Description will now be made about a principle of the motion compensation prediction picture producing device according to this invention.

In order to minimize a prediction error in overlapped motion compensation, a window function is given by:

$$w(m) = 0.5 + 0.5 \frac{pa(m) - pa(M-m)}{1 - P^{(a(m)+a(M-m))/2}},$$

where w(m) represents a value of the window function which should be multiplied to a pixel (picture element) located at a position indicated by a vector m with respect to a center of a motion compensating block (namely, the reference block), P representing an interpixel correlation coefficient between pixels in the input picture, a(m) representing a motion vector predictability for the pixel at the position indicated by the vector m with respect to the center of the motion compensating block (namely, the reference block), and M representing a vector connecting the centers of adjacent motion compensating blocks (namely, adjacent reference blocks).

According to an embodiment of this invention, the window function w(m) is calculated by a window function determining circuit 23 (FIG. 3) which will later be described.

The interpixel correlation coefficient P is calculated in the following manner. An average pixel value is calculated from all pixel values in the input picture. Each pixel value in the input picture is subtracted by the average pixel value to be produced as a pixel value $x_0$. Calculation is made of a square sum $x_0^2$ of the pixel value $x_0$ and a product $x_0 x_1$ of the pixel value $x_0$ and an adjacent pixel value $x_1$ adjacent to the pixel value $x_0$. An average square sum $E[x_0^2]$ and an average product $E[x_0 x_1]$ are calculated also. By the use of those values, the interpixel correlation coefficient P is given by:

$$P = \frac{E[x_0 x_1]}{E[x_0^2]},$$

where E[ . . . ] indicates an operator of calculating an average.

According to the embodiment of this invention, the interpixel correlation coefficient P is calculated by an interpixel correlation detecting circuit 21 (FIG. 3) which will also later be described.

The motion vector predictability a(m) at each pixel is calculated in the following manner. As a result of motion detection, a motion detection prediction error e(m) is obtained for the pixel located at the position indicated by the vector m with respect to the center of the motion compensating block (or the reference block). By the use of the prediction error e(m) together with the interpixel correlation coefficient P and the average square sum $E[x_0^2]$ of the pixel value $x_0$, the predictability a(m) is given by:

$$a(m) = \frac{\log\{1 - (1/2)(E[e^2(m)]/E[x_0^2])\}}{\log P}.$$

According to the embodiment of this invention, the predictability a(m) is calculated by a motion predictability detecting circuit 22 (FIG. 3) which will also later be described.

By calculating the interpixel correlation coefficient and the motion vector predictability as characteristic information to determine the window function, it is possible to improve a prediction efficiency in the overlapped motion compensation.

It is noted here that one of the interpixel correlation coefficient and the motion vector predictability can be given as a known value without calculation. As regards the interpixel correlation coefficient, it is possible to use a previous detection result for a static or still picture. As regards the motion vector predictability, past detection results for several pictures can be used. Thus, an amount of calculation is reduced upon calculation of the window function.

In addition, the interpixel correlation coefficient and the motion vector predictability can be approximately given from other parameters related thereto without calculation. As regards the interpixel correlation coefficient, use may be made of an absolute sum of differential values between adjacent pixels. As regards the motion vector predictability, use is proposed of an absolute sum of the motion detection prediction errors. Thus, an amount of calculation is reduced upon calculation of the window function.

Upon calculation of the interpixel correlation coefficient and the motion vector predictability for each pixel to determine the window function, a time interval may be selected from (1) each motion compensating block (namely, each reference block), (2) each frame or field, and (3) a plurality of frames or fields. With reference to the time interval, adaptive changing or switching of the window function is achieved in response to the characteristic of the input picture. Thus, a prediction efficiency in the overlapped motion compensation can be still further improved.

In order to adaptively change or switch the window function, it is necessary to transmit additional information identifying the window function to a receiving section. It is proposed that a plurality of window functions are prepared and compared with the window function calculated as described above to select a particular window function of a most similarity. Index information identifying the particular window function is coded and is, then, transmitted. Thus, it is possible to suppress the increase of the additional information and to achieve more efficient coding.

Figure 2:
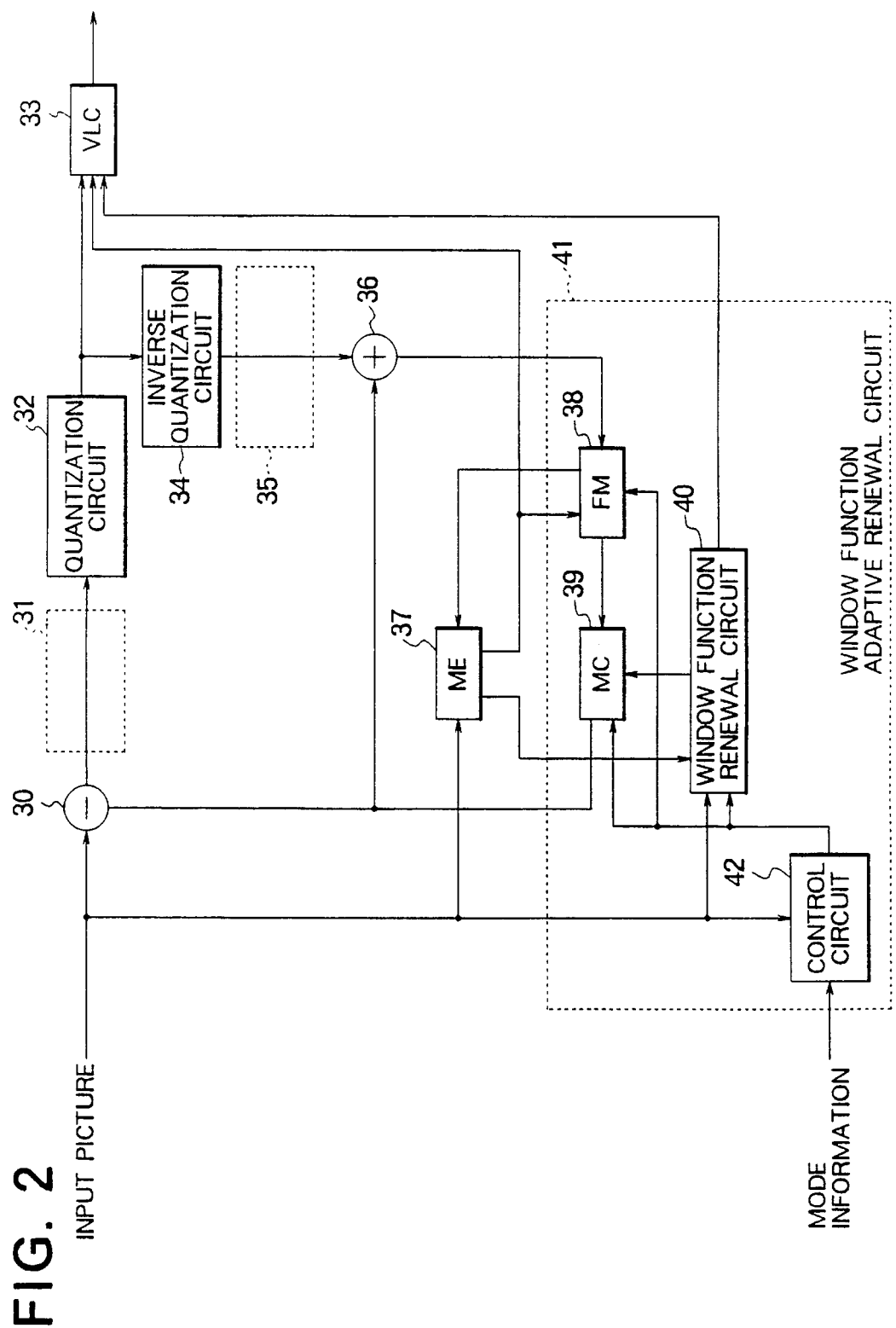
FIG. 2 is a block diagram of a motion picture coding device including a motion compensation prediction picture producing device according to an embodiment of this invention.

Turning to FIG. 2, description will proceed to a motion picture coding device including a motion compensation prediction picture producing device according to an embodiment of this invention. The motion picture coding device receives a digital picture signal representative of successive pictures. Each of the successive pictures comprises a predetermined number of blocks of pixels. The motion picture coding device carries out predictive coding of the digital picture signal by using correlation between a current picture (or an input picture) and a previous picture which precedes the current picture among the successive pictures.

In the motion picture coding device, a subtracter 30 receives the input picture (namely, the current picture)

represented by the digital picture signal and a motion compensation prediction picture which is predictive of the input picture (namely, the current picture) and which is represented by a motion compensation prediction picture signal produced by a motion compensation circuit (MC) 39 included in the motion compensation prediction picture producing device. The subtracter 30 produces a difference signal representative of a difference between the input picture and the motion compensation prediction picture. A quantization circuit 32 receives the difference signal and carries out quantization on the difference signal to produce a quantization result signal.

A variable length coding circuit (VLC) 33 receives the quantization result signal, a motion vector produced by a motion detection circuit (ME) 37, and a window function identifying index produced by a window function renewal circuit 40. The variable length coding circuit 33 carries out variable length coding upon the quantization result signal, the motion vector, and the window function identifying index.

An inverse quantization circuit 34 receives the quantization result signal and carries out inverse quantization on the quantization result signal to produce an inverse quantization result signal. An adder 36 receives the inverse quantization result signal and the motion compensation prediction picture signal produced by the motion compensation circuit 39 and produces a sum signal representative of a sum of the inverse quantization result signal and the motion compensation prediction picture signal as a local decoded signal.

Description will proceed to the motion compensation prediction picture producing device which is for predictively producing the motion compensation prediction picture predictive of the input picture (namely, the current picture) by the use of the previous picture. The motion compensation prediction picture producing device comprises a frame memorizing circuit (FM) 38 which stores, as a reference picture, the previous picture represented by the local decoded signal.

The motion detection circuit 37 receives the input picture signal and carries out motion detection between the input picture represented by the input picture signal and the reference picture stored in the frame memorizing circuit 38. The motion detection circuit 37 produces the motion vector as a result of the motion detection, vector information specifying a reference block of the reference picture, and a prediction error due to the motion detection. The motion detection circuit 37 delivers the motion vector to the variable length coding circuit 33 and the frame memorizing circuit 38, the vector information to the frame memorizing circuit 38, and the prediction error to the window function renewal circuit 40.

In response to the motion vector supplied from the motion detection circuit 37 and to the vector information which specifies the reference block of the reference picture and which is supplied from the motion detection circuit 37, the frame memorizing circuit 38 extracts the reference block and delivers the reference block to the motion detection circuit 37 and to the motion compensation circuit 39.

The motion compensation circuit 39 multiplies pixel values of the reference block supplied from the frame memorizing circuit 38 by a window function supplied from the window function renewal circuit 40 and adds or overlaps multiplication results to produce the motion compensation prediction picture signal representative of the motion compensation prediction picture. The motion compensation prediction picture signal is delivered to the subtracter 30.

The window function renewal circuit 40 receives the input picture signal and the prediction error supplied from the motion detection circuit 37 and produces the window function (which is delivered to the motion compensation circuit 39) and the window function identifying index which is delivered to the variable length coding circuit 33. The window function identifying index specifies the window function.

A control circuit 42 receives the input picture signal and mode information which defines a window function calculation process and a window function renewal process. The control circuit 42 produces control information which includes a window function mode representative of the window function calculation process, a renewal timing representative of a timing of renewal of the window function, position information representative of block number of each block of the input picture in order to specify the reference block to be extracted, and another position information representative of a pixel position which specifies each pixel in each block of the input picture.

A window function adaptive renewal circuit 41 includes the frame memorizing circuit 38, the motion compensation circuit 39, the window function renewal circuit 40, and the control circuit 42 and carries out a window function adaptive renewal operation in the manner which will presently be described.

Figure 3:
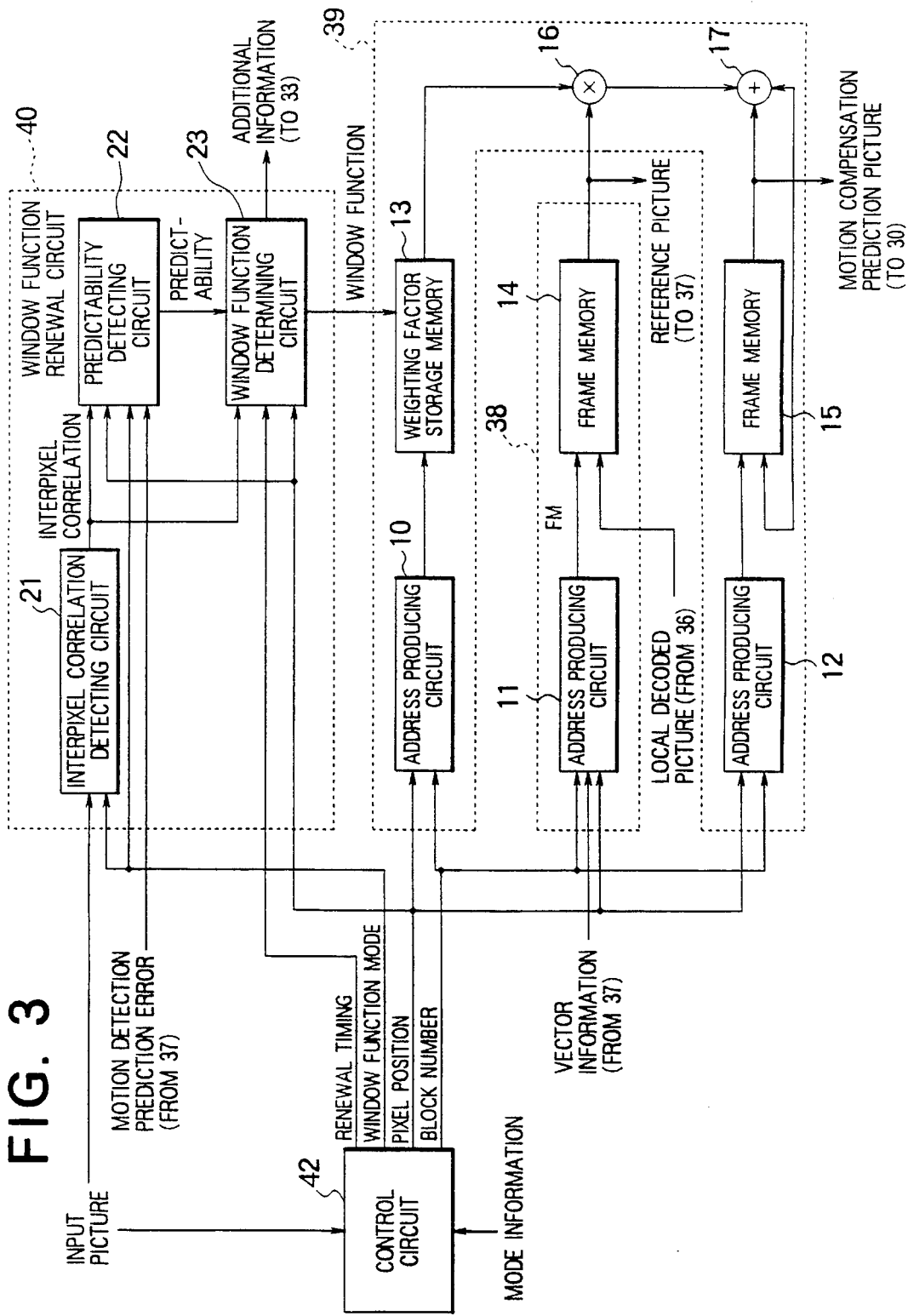
FIG. 3 is a block diagram of a window function adaptive renewal circuit of the motion compensation prediction picture producing device included in the motion picture coding device illustrated in FIG. 2.

Turning to FIG. 3, description will proceed to the window function adaptive renewal circuit 41 (FIG. 2). In FIG. 3, three areas surrounded by dotted lines correspond to the frame memorizing circuit 38, the motion compensation circuit 39, and the window function renewal circuit 40 in the motion picture coding device illustrated in FIG. 2.

A first address producing circuit 10 receives the block number representative of each of the blocks of the input picture and the pixel position within each of the blocks and produces a first address of a weighting factor storage memory 13. The first address of the weighting factor storage memory 13 corresponds to the value of the window function which should be multiplied to the pixel value of the reference block.

A second address producing circuit 11 receives the block number, the pixel position, and the vector information produced by the motion detection circuit 37 and produces a second address of a frame memory 14. The second address of the frame memory 14 corresponds to the pixel value of each pixel of the reference block.

A third address producing circuit 12 receives the block number and the pixel position and produces a third address of a frame memory 15. The third address of the frame memory 15 corresponds to each pixel value within the motion compensation prediction picture. Each pixel value within the motion compensation prediction picture. corresponds to the reference block.

The weighting factor storage memory 13 stores the window function supplied from the window function renewal circuit 40 and delivers, to a multiplier 16, the value of the window function from the first address indicated by the first address producing circuit 10.

The frame memory 14 stores a local decoded picture supplied from the adder 36 and delivers, to the multiplier 16 and to the motion detection circuit 37, the pixel value from the second address indicated by the second address producing circuit 11. The multiplier 16 produces a multiplication result signal representative of a product of the value of the window function from the weighting factor storage memory 13 and the pixel value of the reference block supplied from the frame memory 14. The multiplier 16 delivers the multiplication result signal to an adder 17.

The frame memory 15 stores the motion compensation prediction picture and delivers, to the adder 17, the pixel value from the third address indicated by the third address producing circuit 12. The adder 17 produces an addition result signal representative of a sum of the multiplication result signal and the pixel value of the motion compensation prediction picture supplied from the frame memory 15. The frame memory 15 stores the addition result signal from the adder 17 in the third address indicated by the third address producing circuit 12 and delivers a final motion compensation prediction picture to the subtracter 30. Every time when processing of either each frame or each field comes to an end, a content of the frame memory 15 is reset to zero.

An interpixel correlation detecting circuit 21 receives the input picture signal and the window function mode and produces an interpixel correlation signal representative of an interpixel correlation of the input picture.

A motion predictability detecting circuit 22 receives the interpixel correlation signal, the pixel position, the motion detection prediction error from the motion detection circuit 37, and the window function mode and produces a motion detection predictability.

A window function determining circuit 23 receives the interpixel correlation signal from the interpixel correlation detecting circuit 21, the motion detection predictability from the motion predictability detecting circuit 22, the pixel position from the control circuit 42, and the renewal timing from the control circuit 42 and determines the window function (which is delivered to the weighting factor storage memory 13) and the window function identifying index which is delivered to the variable length coding circuit 33 as an additional information.

Summarizing in FIGS. 2 and 3, the motion compensation prediction picture producing device is supplied with a digital picture signal representative of successive pictures for predictively producing a motion compensation prediction picture predictive of a current picture (or an input picture) by using a previous picture which precedes the current picture among the successive pictures. Each of the successive pictures comprises a predetermined number of blocks of pixels.

The motion compensation prediction picture producing device comprises a memorizing circuit (38) which memorizes the previous picture as a reference picture. Connected to the memorizing circuit (38), a vector detecting circuit (37) detects a motion vector representative of a movement of each block of the current picture between the current and the reference pictures. The vector detecting circuit (37) delivers the motion vectors for the blocks of the current picture to the memorizing circuit (38) and causes the memorizing circuit (38) to produce, as reference blocks, those blocks of the reference picture which are determined by the motion vectors for the blocks of the current picture.

A window function producing circuit (40) produces a window function in response to the current picture. The window function producing circuit (40) comprises an interpixel correlation calculating circuit (21) for calculating an interpixel correlation from the pixels of the current picture and a window function determining circuit (23) connected to the interpixel correlation calculating circuit (21) for determining the window function on the basis of the interpixel correlation.

Connected to the memorizing circuit (38) and the window function producing circuit (40), a prediction picture producing circuit (39) produces the motion compensation prediction picture given by multiplying each of the reference blocks by the window function and by adding or overlapping the reference blocks multiplied by the window function to one another.

The vector detecting circuit (37) may further produce, in response to the reference blocks, a prediction error between each pixel of each block of the current picture and each pixel of each of the reference blocks that is determined by the motion vector for each block of the current picture.

In this case, the window function producing circuit (40) comprises the interpixel correlation calculating circuit (21), a predictability calculating circuit (22) connected to the vector detecting circuit (37) and the interpixel correlation calculating circuit (21) for calculating a predictability for the motion vector for each block of the current picture by the use of the interpixel correlation and the prediction error, and the window function determining circuit (23) connected to the interpixel correlation calculating circuit (21) and the predictability calculating circuit (22) for determining the window function on the basis of the interpixel correlation and the predictability.

Alternatively, the window function producing circuit (40) comprises the interpixel correlation calculating circuit (21), the predictability calculating circuit (22), and the window function determining circuit (23) connected only to the predictability calculating circuit (22) for determining the window function on the basis of the predictability.

The digital picture signal may comprise either successive frames or successive fields as the successive pictures.

Referring to FIG. 2, description will proceed to operation of the motion picture coding device. The digital picture signal comprises the pictures (either frames or fields) is delivered to the motion detection circuit 37. The motion detection circuit 37 carries out the motion detection between the input or current picture and the previous or reference picture stored in the frame memorizing circuit 38. The motion detection circuit 37 thereby produces the motion vector for each motion compensating block (namely, each reference block). The motion vector is delivered to the frame memorizing circuit 38 and the variable length coding circuit 33. Simultaneously, a motion detection prediction error is obtained from the motion detection circuit 37 and delivered to the window function renewal circuit 40.

In response to a motion compensating block position information (or a reference block position information) defined by the control circuit 42 and the motion vector given by the motion detection circuit 37, the frame memorizing circuit 38 extracts the reference block which is sent to the motion compensation circuit 39. The motion compensation circuit 39 multiplies the reference block by the window function supplied from the window function renewal circuit 40. The motion compensation circuit 39 produces the final motion compensation prediction picture by overlapping or adding motion compensation prediction pictures in accordance with the motion compensation block position information defined by the control circuit 42.

On the other hand, the window function renewal circuit 40 is responsive to the input picture and the motion detection prediction error from the motion detection circuit 37 and renews the window function in accordance with the control information given by the control circuit 42. Simultaneously, the window function renewal circuit 40 delivers the window function identifying index indicative of a shape of the window function to the variable length coding circuit 33. In accordance with the input picture and the mode information which defines the window function calculation process and the window function renewal process, the control circuit 42 produces the control information which includes the window function calculation process, the timing of renewal of the window function, the position information of the reference block to be extracted, and the position information of each pixel in each block of the input picture.

The final motion compensation prediction picture is delivered to the subtracter 30 to produce the difference between the final motion compensation prediction picture and the input picture. The difference is quantized by the quantization circuit 32 into the quantization result signal which is delivered to the variable length coding circuit 33 and the inverse quantization circuit 34. The variable length coding circuit 33 carries out the variable length coding on the quantization result signal, the motion vector from the motion detection circuit 37, and the index representative of the shape of the window function from the window function renewal circuit 40 to produce an external output signal.

The quantization result signal is subjected to the inverse quantization to be produces as an inverse quantization result signal which is delivered to the adder 36. The adder 36 produces a sum of the inverse quantization result signal and the motion compensation prediction picture given by the motion compensation circuit 39 to produce a local decoded picture. The local decoded picture is stored in the frame memorizing circuit 38. Thus, coding of one picture (that is, one frame or one field) is completed.

Turning again to FIG. 3, description will proceed to operation of the window function adaptive renewal circuit 41 (FIG. 2). The interpixel correlation detecting circuit 21 calculates the interpixel correlation in accordance with the input picture and the window function mode given by the control circuit 42. When the window function mode indicates to use the motion predictability alone in calculating the window function, the interpixel correlation detecting circuit 21 does not calculate the interpixel correlation but produces a predetermined interpixel correlation.

The motion predictability detecting circuit 22 calculates the motion detection predictability in response to the interpixel correlation from the interpixel correlation detecting circuit 21, to the motion detection prediction error from the motion detection circuit 37, and to the pixel position from the control circuit 42, and the window function mode which is also supplied from the control circuit 42. When the window function mode indicates to use the interpixel correlation alone in calculating the window function, the motion predictability detecting circuit 22 does not calculate the motion detection predictability but produces a predetermined motion detection predictability.

Receiving the interpixel correlation from the interpixel correlation detecting circuit 21, the motion detection predictability from the motion predictability detecting circuit 22, and the pixel position within the input block from the control circuit 42, and the renewal timing of the window function from the control circuit 42, the window function determining circuit 23 calculates the window function to write the window function in the weighting factor storage memory 13 of the motion compensation circuit 39 and to deliver the window function identifying index indicative of the shape of the window function to the variable length coding circuit 33. It is noted here that the renewal timing defines that the renewal of the window function should be carried out for each motion compensating block (namely, each reference block), for either each frame or each field, or for either a plurality of the frames or a plurality of fields.

The second address producing circuit 11 of the frame memorizing circuit 38 is supplied from the control circuit 42 with the block number specifying the position of the motion compensating block (namely, the reference block) and the pixel position within the input block, and furthermore supplied from the motion detection circuit 37 with motion vector information. In the frame memorizing circuit 38, the second address producing circuit 11 produces the second address of the frame memory 14. The local decoded picture is stored in the second address of the frame memory 14 and is, then, extracted from the frame memory 14 as the reference block.

The first address producing circuit 10 of the motion compensation circuit 39 is supplied from the control circuit 42 with the block number specifying the position of the motion compensating block (namely, the reference block) and the pixel position within the input block. In the motion compensation circuit 39, the first address producing circuit 10 produces the first address of the weighting factor storage memory 13. The window function is stored in the first address of the weighting factor storage memory 13 and is, then, delivered to the multiplier 16. The multiplier 16 calculates the product of the window function and the reference block supplied from the frame memory 14.

The third address producing circuit 12 of the motion compensation circuit 39 is supplied from the control circuit 42 with the block number specifying the position of the motion compensating block (namely, the reference block) and the pixel position within the input block. In the motion compensation circuit 39, the third address producing circuit 12 produces the third address of the frame memory 15. The motion compensation prediction picture is stored in the third address of the frame memory 15 and is, then, extracted from the frame memory 15 in correspondence to the position of the reference block. The adder 17 calculates a sum of the motion compensation prediction picture and the reference block multiplied by the window function from the multiplier 16 to store the sum in the frame memory 15.

According to this invention which is described above and which uses either a combination of the interpixel correlation as spatial characteristic information of the input picture and the average value of vector offsets as temporal characteristic information or parameters related thereto on the basis of a solution of a minimization problem of the prediction error in the overlapped motion compensation, the window function for the overlapped motion compensation is given as an optimum prediction factor so that prediction of the input picture from the reference block statistically becomes optimum. As a result, motion compensation predication is achieved with the prediction error reduced as compared with the conventional device. Considering that the optimum prediction factor varies in dependence upon a local characteristic of the input picture, the window function which serves as the prediction factor is changed or switched to adapt such variation of the optimum prediction factor. As a consequence, it is possible to achieve the motion compensation prediction with the prediction error still further reduced. In this case, reduction of the prediction error is maximum by changing or switching the window function for each motion compensating block (namely, each reference block). When the window function is changed or switched either for each frame or each field or for a plurality of the frames or the fields, it is possible to suppress an increase of overhead information specifying the shape of the window function.

While this invention has thus far been described in conjunction with a preferred embodiment thereof, it will readily possible for those skilled in the art to put this invention into practice in various other manners. For example, the inverse quantization circuit 34 may be removed or omitted from the motion picture coding device illustrated in FIG. 2. Alternatively, in the motion picture coding device illustrated in FIG. 2, a transform circuit 31, which is typically an orthogonal transform circuit for carrying out orthogonal transform, may be connected between the subtracter 30 and the quantization circuit 32. In this case, an inverse transform circuit 31, which is typically an inverse orthogonal transform circuit for carrying out inverse orthogonal transform, should be connected between the inverse quantization circuit 34 and the adder 36.

What is claimed is:

1. A motion compensation prediction picture producing device supplied with an digital picture signal representative of successive pictures for predictively producing a motion compensation prediction picture predictive of a current picture by using a previous picture which precedes said current picture among said successive pictures, each of said successive pictures comprising a predetermined number of blocks of pixels, said motion compensation prediction picture producing device comprising:

memorizing means for memorizing said previous picture as a reference picture;

vector detecting means connected to said memorizing means for detecting a motion vector representative of a movement of each block of said current picture between said current and said reference pictures, said vector detecting means delivering the motion vectors for the blocks of said current picture to said memorizing means to cause said memorizing means to produce, as reference blocks, the blocks of said reference picture that are determined by said motion vectors for the blocks of said current picture;

window function producing means for producing a window function in response to said current picture; and prediction picture producing means connected to said memorizing means and said window function producing means for producing said motion compensation prediction picture given by multiplying each of said reference blocks by said window function and by adding said reference blocks multiplied by said window function to one another.

2. A motion compensation prediction picture producing device as claimed in claim 1, wherein said digital picture signal comprises successive frames as said successive pictures.

3. A motion compensation prediction picture producing device as claimed in claim 1, wherein said digital picture signal comprises successive fields as said successive pictures.

4. A motion compensation prediction picture producing device as claimed in claim 1, wherein said window function producing means comprises:

interpixel correlation calculating means for calculating an interpixel correlation from the pixels of said current picture; and window function determining means connected to said interpixel correlation calculating means for determining said window function on the basis of said interpixel correlation.

5. A motion compensation prediction picture producing device as claimed in claim 4, wherein said digital picture signal comprises successive frames as said successive pictures.

6. A motion compensation prediction picture producing device as claimed in claim 4, wherein said digital picture signal comprises successive fields as said successive pictures.

7. A motion compensation prediction picture producing device as claimed in claim 1, wherein:

said vector detecting means further produces, in response to said reference blocks, a prediction error between each pixel of each block of said current picture and each pixel of each of said reference blocks that is determining by said motion vector for each block of said current picture;

said window function producing means comprising:

interpixel correlation calculating means for calculating an interpixel correlation from the pixels of said current picture;

predictability calculating means connected to said vector detecting means and said interpixel correlation calculating means for calculating a predictability for said motion vector for each block of said current picture by the use of said interpixel correlation and said prediction error; and window function determining means connected to said interpixel correlation calculating means and said predictability calculating means for determining said window function on the basis of said interpixel correlation and said predictability.

8. A motion compensation prediction picture producing device as claimed in claim 7, wherein said digital picture signal comprises successive frames as said successive pictures.

9. A motion compensation prediction picture producing device as claimed in claim 7, wherein said digital picture signal comprises successive fields as said successive pictures.

10. A motion compensation prediction picture producing device as claimed in claim 1, wherein:

said vector detecting means further produces, in response to said reference blocks, a prediction error between each pixel of each block of said current picture and each pixel of each of said reference blocks that is determined by said motion vector for each block of said current picture;

said window function producing means comprising:

interpixel correlation calculating means for calculating an interpixel correlation from the pixels of said current picture;

predictability calculating means connected to said vector detecting means and said interpixel correlation calculating means for calculating a predictability for said motion vector for each block of said current picture by the use of said interpixel correlation and said prediction error; and window function determining means connected to said predictability calculating means for determining said window function on the basis of said predictability.

11. A motion compensation prediction picture producing device as claimed in claim 10, wherein said digital picture signal comprises successive frames as said successive pictures.

12. A motion compensation prediction picture producing device as claimed in claim 10, wherein said digital picture signal comprises successive fields as said successive pictures.

* * * * *